United States Patent [19]

Schornack

[11] 4,439,688

[45] Mar. 27, 1984

[54] ELECTRICAL CONTROL APPARATUS

[75] Inventor: Louis W. Schornack, Niles, Ill.

[73] Assignee: Dynascan Corporation, Chicago, Ill.

[21] Appl. No.: 255,046

[22] Filed: Apr. 17, 1981

Related U.S. Application Data

[63] Continuation-in-part of Ser. No. 132,088, Mar. 20, 1980, which is a continuation-in-part of Ser. No. 22,453, Mar. 21, 1979.

[51] Int. Cl.³ .............................................. H01H 9/00
[52] U.S. Cl. .................................... 307/115; 307/157; 315/362
[58] Field of Search ...................... 307/116, 141, 141.4, 307/140, 130, 152 E, 145, 157, 41, 240, 252 B, 590, 96, 115; 340/309.4, 309.5, 309.1; 315/360, 246, 362; 364/104; 361/160, 181

[56] References Cited

U.S. PATENT DOCUMENTS

| | | | |
|---|---|---|---|
| 3,239,723 | 3/1966 | Washington et al. | 307/130 X |
| 4,002,925 | 1/1977 | Monahan | 307/141 |
| 4,035,661 | 7/1977 | Carlson | 307/141 |
| 4,151,425 | 4/1979 | Cappa | 307/130 |
| 4,169,982 | 10/1979 | Rittmann | 307/116 |
| 4,213,063 | 7/1980 | Jones | 307/141 |

*Primary Examiner*—G. Z. Rubinson
*Assistant Examiner*—S. D. Schreyer
*Attorney, Agent, or Firm*—Wallenstein, Wagner, Hattis, Strampel & Aubel

[57] ABSTRACT

An electrical controller, such as a controller timer for a home lighting circut, is connected so that a power switch like a triac controlled thereby replaces a conventional toggle switch operating in conjunction with another toggle switch in series therewith which can operate the controller. The timer is continuously coupled to the AC power system by permanent connections between the movable pole of the remaining toggle switch station and the load terminal of the triac of the controller and the power system. A stationary contact of the switch forms a control signal terminal which extends to a control input terminal of the controller. The controller may also include a depressible pushbutton or other on-off control switch which when successively operated generates pulses which toggle a control circuit to alternately render the triac conductive and non-conductive, and to program a controller-timer. The controller includes a voltage change pulser circuit whose input is coupled through the control input terminal of the timer to the stationary control contact of the single-pole switch, and which preferably generates the identical signal as is generated by depression of the pushbutton, when the signal condition on the stationary control contact either changes from a no-signal to a signal condition, or from a signal to a no-signal condition.

19 Claims, 15 Drawing Figures

POWER SWITCH 24 OPEN & POLE 13a DISENGAGED FROM CONTROL CONTACT 13c

*Fig 7B*

POWER SWITCH 24 CLOSED & POLE 13a DISENGAGED FROM CONTROL CONTACT 13c

*Fig 7A'*

POWER SWITCH 24 OPEN & POLE 13a DOES NOT CONTACT CONTROL CONTACT 13c & POWER LINE VOLTAGE COUPLED TO CONTROL LINE 15

ELECTRICAL CONTROL APPARATUS

RELATED APPLICATION

This application is a continuation-in-part of application Ser. No. 132,088, filed Mar. 20, 1980, which, in turn, is a continuation-in-part of said application Ser. No. 022,453, filed Mar. 21, 1979.

DESCRIPTION

Technical Field

The present invention relates to control apparatus to be electrically connected to an external power circuit, such as a 110 volt AC circuit, which already includes or is to include an external electrical switch including a movable contact or pole, movable between two stationary contacts, such as a conventional single-pole, double-throw switch commonly used in a 3-way switch configuration. The electrical control apparatus of the present invention is designed uniquely to respond to the operation of this single-pole switch, as well as to control signals to be generated by operation of either another switch, which is a part of the apparatus involved, or by remotely generated signals fed through the power circuit to the control apparatus. Either the latter signals or the operation of the aforementioned single-pole switch will actuate the control apparatus to energize or de-energize an electrical device, like a lighting unit, which is either already connected and a part of the external power circuit, or can be connected directly to the control apparatus.

The most important application of the present invention is in a user-programmable electric controller-timer for controlling electrical lighting circuits in homes, where the timer apparatus is insertable in place of a conventional toggle switch already wired to another similar toggle switch connected in a 3-way switch configuration, so that either switch can control the lighting circuit. The controller-timer may include a pushbutton switch which can energize and de-energize the lighting circuit both when the timer is turned off and when the timer is on, and as a means for programming the timer, as disclosed in co-pending U.S. application Ser. No. 022,453, filed Mar. 21, 1979. The timer disclosed in this application is deficient in that it is not adapted to be operated by a single-pole, double-throw switch already connected externally to the toggle switch station replaced by the controller-timer. While many aspects of the present invention apply to control apparatus other than controller-timers, the invention will be disclosed in the environment of a timer of the type disclosed in this application.

BACKGROUND OF THE INVENTION

Application Ser. No. 022,453 discloses a power supply and electronic controller-timer combination for a lighting power circuit in which the controller-timer, arranged for either automatic user-programmed or manual control of a power switch, and its power supply can be connected in series with the alternating current power source and the lighting device load. Thus, a lighting fixture, normally controlled by a single-pole wall mounted switch, is automatically or manually controlled by the electronic control system there disclosed which replaces the single-pole switch with a power switch, like a triac, connected in series with the load in the same manner as the original switch. It is obvious that for the above-mentioned system reliably to operate, the controller must be supplied with power at all times, even when the controller-timer closes the power circuit and nearly all of the source voltage is dropped across the load. In such case, the power supply preferably draws its operating power from across the triac during the few degrees at the beginning of each operation half cycle during which the triac is non-conductive before it is re-fired.

The mass customer commercial acceptance of such a controller-timer depends on the ability of almost any user to install the apparatus in place of any single-pole wall switch. Since the operation of the controller-timer depends on a continuously energized power supply, the presence of additional switches in series with the replaced wall switch, such as in a 3-way circuit, renders the controller-timer inoperative as soon as the latter switch is opened.

The controller-timer disclosed in this application is a 24-hour repeat cycle timer which preferably has a control marker storage memory unit, which is most advantageously a recirculating marker bit shift register, energized from said power supply and having the same number of stages or storage locations as the number of basic programmable time intervals, e.g. 15 or 30 minutes, over a 24-hour period. Output sensing from a selected register stage actuates the triac in a conductive or non-conductive mode in accordance with the pattern of "ON" or "OFF" marker bits stored in the memory unit. The marker bit pattern is advanced automatically at the regular basic timing intervals by internal timing means. A pushbutton control is provided both for normal non-timer operation of the triac and as an override control to allow the user to change the state of the triac while the timer is in a timer-on mode of operation without disturbing the stored bit pattern. The timer can be rapidly programmed to set the desired pattern of markers in the memory unit in a manner of a minute or so by rotating a time interval indicating dial knob which may also act as the depressible pushbutton, and depressing the same at the desired time to effect the desired triac state. In another mode of operation, real time programming is achieved during the first 24 hours after the timer is activated by application of power in accordance with the load device on and off duty profile as obtained by the normal operation of the pushbutton used as a normal on and off control.

The controller-timer just described obviously cannot, without the features of the invention to be described, be useable in series with a 3-way single pole switch not only because this switch can be operated to a circuit-opening condition which would cause the power supply to fail and the controller-timer to become inoperative with loss of the volatile marker bits stored in the memory unit, but also because of the fact that the user may mistakenly believe that a single pole switch still in series with the old replaced switch can operate the lighting circuit involved and program the timer in the same way as the pushbutton operates to carry out these functions. This problem can be overcome by the user removing this single pole switch and jumpering the power circuit connected terminals thereof. However, it is desirable to avoid the necessity of the user removing the single pole switch, and to enable the user to use this single pole switch for both programming of the timer, and for operation of the lighting circuit when the timer is on or off, so that it duplicates the operation of the controller-timer pushbutton.

It is accordingly, one of the objects of the invention to provide an electric controller including a power switch, such as a triac, to be connected in series with an external power circuit which includes a single pole switch in series with the power switch and wherein the controller may be operated and preferably also programmed by operation of the single pole switch.

A related object of the invention is to provide a controller-timer as described above, wherein the single pole switch connected in series therewith duplicates the function of the pushbutton control described, so that its successive operation energizes and de-energizes the load circuit involved and can program the timer.

A more specific object of this invention is to provide for a "3 way" (two location) switch control system in a constantly connected series circuit consisting of a source of electrical power, a single conductor connecting one polarity of the power source to a load, a single conductor connecting the load to either of the two control locations, two conductors connecting the two control locations, and a single wire connecting the second control location to the other polarity of the power source. It is a further object of this invention to permit one of the control locations to use a single pole switch to effect a change of state of the power applied to the load whenever the single pole switch is operated to one or the other of a pair of contacts, said change of state of the load condition to take place regardless of whether the single pole switch is operated from one or the other of said contacts.

SUMMARY OF THE INVENTION

The present invention, in part, relates to the unique concept of utilizing the single pole switch referred to in an unusual manner. Thus, instead of removing the single pole switch and jumpering the two main power circuit terminals involved to maintain continuity of the power circuit, the single pole switch is left in place and a jumper is connected between the movable pole and one of the stationary contacts which is to be connected in series with the power switch of the controller, so that the single pole switch will not interfere with power continuity to the controller, and the other stationary contact is used as a control contact electrically connected to a control terminal input of the controller involved. It will be apparent that as the movable pole is moved between the first mentioned stationary contact and the control stationary contact, the signal condition of the latter contact changes from a no-signal to a signal condition, and when the pole is returned from the latter stationary contact to the former stationary contact, the signal condition of the control terminal changes from a signal condition to a no-signal condition. In accordance with the present invention, a controller, whether it be a controller-timer or another type of controller, is provided with a control circuit which includes what is to be referred to as a voltage change pulser circuit which generates a given signal, which can change or as in the preferred application of the invention, does not change, such as a positive pulse, each time the signal condition of the control contact of the single pole switch changes from a no-signal to a signal or from a signal to a no-signal condition. In accordance with another aspect of the invention, the controller also has a separate manually operable control, such as a pushbutton switch, which bridges a pair of contacts during the depression thereof, momentarily to generate the same signal as said pulser circuit generates. By coupling the output of the pushbutton switch and the output of the voltage change pulser circuit through an "OR" gate to the control circuitry of the controller involved, the identical control operation can be carried out by either depressing the pushbutton switch or the moving of the single pole switch from either stationary contact to the other. A toggle circuit responding to the "OR" gate output can alternately operate the power switch between the circuit opening and closing conditions. In the timer application of the invention, the single pole switch or the pushbutton switch can also effect programming of the timer.

In accordance with another aspect of the invention, the voltage change pulser circuit is associated with logic circuit elements and connections made to the external power circuit including the single pole switch, which greatly increases the reliability of operation thereof, so that any 60 cycle power circuit voltage coupled by inter-conductor capacitance to the conductor extending from the control contact of the single pole switch will not result in false operation of the voltage change pulser circuit when the control contact is not engaged by the movable pole of the switch and is presumably in a no-signal condition.

BRIEF DESCRIPTION OF THE DRAWINGS

FIG. 3 is a detailed block diagram of the controller-timer shown only pictorially in FIG. 2;

DETAILED DESCRIPTION OF INVENTION

Figure 1:
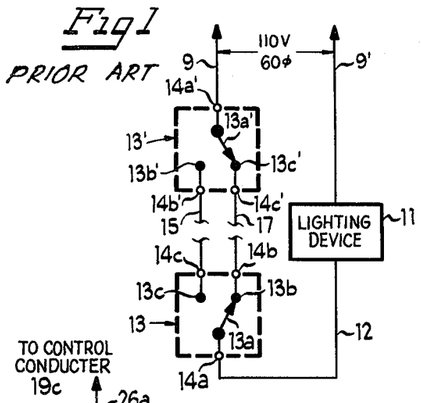
FIG. 1 is a circuit diagram of a lighting circuit operated by a 3-way switching system comprising a pair of single pole, double-throw switches connected in series, so that either switch can energize or de-energize the lighting circuit.

Referring now to FIG. 1, there is shown therein a typical 3-way switch control system for controlling the energization of a power circuit for a lighting device 11. Power conductors 9—9' of a 110 volt 60 cycle power system are shown with the power conductor 9' extending to one of the terminals of the lighting device whose other terminal is connected by a conductor 12 to a single pole, double-throw switch 13 usually mounted in a wall switch opening. The switch 13 is usually a toggle-type switch which includes three screw terminals 14a, 14b and 14c to which conductors extending in wall conduit are secured. Switch 13 is shown having a movable pole 13a permanently connected to the screw terminal 14a to which the conductor 12 is connected, the movable pole being selectively movable between a stationary contact 13b connected to the screw terminal 14b and a stationary contact 13c connected to the screw terminal 14c. Conductors 15 and 17 extend to screw terminals 14b' and 14c', respectively, of another similar single-pole, double-throw toggle switch 13' usually mounted remotely from the switch 13, so that the lighting circuit involved can be turned on and off from either one of these switch stations. Switch 13' has a movable pole 13a' connected to screw terminal 14a', the pole being selectively movable between stationary contact 13c' connected to screw terminal 14c' and a stationary contact 13b' connected to the screw terminal 14b'. The movable pole connected screw terminal 14a' is connected to the power conductor 9. It is apparent from the switch configuration shown in FIG. 1, that the lighting circuit involved can be selectively energized and de-energized by either one of the switches 13 or 13'.

Figure 2:
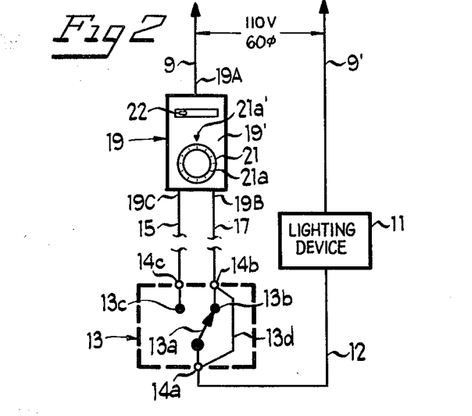
FIG. 2 is a circuit diagram of the lighting circuit of FIG. 1, except that one of the single pole, double-throw switches has been replaced by a controller-timer of the invention, and the other single pole, double-throw switch has been jumpered to enable the same to operate the controller-timer of the invention.

FIG. 2 shows the unique substitution of one of the switches, such as the switch 13' in the example shown, by a controller-timer 19 similar to that disclosed in the previously identified co-pending Application Ser. Nos. 132,088 and 022,453. As will appear from a description of the circuitry of FIG. 3, the controller-timer 19 includes a triac power switch 24 whose load terminals 24a and 24b are connected between the conductors 9 and 17 through power circuit connecting connectors 19A and 19B (the ends of which are sometimes referred to as terminals). The other switch 13 is left intact and a jumper 13d is connected between the screw terminals 14b and 14a so that there is continuous continuity through the switch 13 to the power circuit connecting conductor 19B of the controller-timer 19. The stationary contact 13c associated with the other screw terminal 14c of the switch 13 is connected by the said conductor 15 to a control conductor 19B of the controller-timer 19. It is thus apparent that when the movable pole 13a of the switch 13 is in the position shown in FIG. 2, where it is connected to the stationary contact 13b, there is a no-signal condition on what will now be referred to as the control contact 13c of the switch 13. When the movable pole 13a is moved to make contact with the control contact 13c, a signal condition appears on the terminal 13c. This change in condition from a no-signal to a signal condition coupled to the control conductor 19C of the controller-timer 19 will result in the generation of a control signal in the controller-timer 19 which will reverse the condition of the power triac from a conductive to a non-conductive or from a non-conductive to a conductive condition. When the movable pole 13a is moved from the control contact 13c to the stationary contact 13b, the change in condition of the contact 13c from a signal to a no-signal condition coupled to control conductor 19C of the controller-timer will similarly modify the condition of the power triac of the timer. The change of the position of the movable pole 13a can also perform programming functions to be described.

As disclosed in said applications, the controller-timer 19 in the most desired commercial form for the invention comprises front and rear housing sub-assemblies mountable respectively in front of and behind a switch station of a slotted wall switch cover plate through which a toggle switch arm normally extends. A rotatable and depressible time dial knob 21 exposed on the front panel of the front housing sub-assembly 19' is connected to a rotatable and depressible shaft (not shown) passing through the cover plate slot. A timer condition setting arm 22 exposed also on this panel and connected through said cover plate slot to operating means on the rear housing subassembly is movable between "OFF/CLEAR", "MAN." and "ON" positions respectively where power is interrupted to the timer through an air gap switch, the power triac is only controlled by the depression of knob 21 and the power triac is automatically controlled by a user established program. The time dial knob 21 may have time indicia on the periphery 21a thereof which can be brought into position opposite an index mark 21a' to identify a particular timing interval for fast programming or program read-out purposes. The timer is also programmed automatically by the depression of the time dial knob 21 or operation of the switch 13 during a real time programming operation established during the first 24 hours of operation of the timer during a fast or real time programming operation. Depression of knob 21 or operation of switch 13 sets power-on or power-off markers in storage locations in a memory section of the controller-timer in accordance with the condition of the power switch obtained by such operations.

For a better understanding of the operation of the controller-timer 19, reference should now be made to FIG. 3. As there shown, the circuit controlled by the timer is a lighting circuit energized from a pair of 110 volt, 60 cycle power lines 9—9'. The timer also derives its energizing power from these power lines 9—9' but indirectly therefrom in a manner to be described. The power line 9 is connected to the timer power circuit connecting conductor 19A extending to a pair of spaced stationary contacts 23a–23b which can be bridged by a wiper 23c whose position is determined by the movement of the timer condition setting arm 22. The contacts 23a–23b are bridged by the wiper 23c when the arm 22 is moved to the timer "MAN" or "ON" positions. A conductor 25 extends from the stationary contact 23b to one of the load terminals 24a of the power triac 24 whose other load terminal 24b is connected to the timer power circuit connecting conductor 19B.

The power triac 24 is controlled in a well known manner through its control terminal 24c connected to a source of current which can render the power triac conductive generally at a point several degrees after the time the applied AC voltage passes through zero each half cycle involved. The control terminal 24c is shown connected to a control circuit 27d of a DC power supply circuit 27. This short period during which the power triac 24 is non-conductive is sufficient to provide a voltage drop across the terminals of the power triac to energize the DC power supply 27, which charges a capacitor 27a through a rectifier 27b. (There are a number of such prior art DC power supplies which can be used.) A conductor 29 connected to the triac load terminal 24a extends to the juncture of rectifier 27b and a resistor 27c. The anode of rectifier 27b and the plate of capacitor 27a are shown connected to ground and the ungrounded plate of capacitor 27a which is the V+ terminal of the supply, is shown connected to the control circuit 27d connected by a conductor 27 to the other load terminal 24b of the power triac 24. Suffice it to say, the DC power supply develops across the capacitor 27a a charge sufficient preferably to energize all the circuits referred to, and to energize at least the memory portions of the circuit to be described for several minutes, should power be completely interrupted from the timer for such a period. In such case, a momentary power failure will not destroy the programming of the timer.

When the timer condition setting control arm 22 is placed on the "OFF/CLEAR" position, the wiper 23c bridges the contacts 23a' and 23b' and opens contacts 23a and 23b to form an air gap interrupting power to the controller-timer as is required for UL approval of the timer.

While the timer in FIG. 2 is shown with a time dial knob 21 for fast programming, since fast programming has nothing to do with the present invention and the timer control circuit is greatly simplified if it is only shown adapted to a real time programming of the timer, FIG. 3 has eliminated therefrom those circuit elements needed for this purpose. FIG. 3 shows the switch 28 which is operated by depression of the time dial knob 21. Thus, when the time dial knob 21 is depressed, a contact 28c bridges a pair of stationary contacts 28a and 28b to couple the V+ output of the DC power supply 27 to a conductor 31, connected to ground through a resistor 105 and extending to the input 30b of an "OR" gate 30, whose other input 30a is connected by conductor 60 to the output 26b of a voltage change pulser circuit 26 shown in detail in FIG. 4 to be described. The output 30c of "OR" gate is connected by a conductor 31 to input 32a of an "OR" gate 30 which output is fed to the toggle input of a toggle bistable 34.

The voltage change pulser circuit 26 has an input 26a connected by a conductor 20 to the control conductor 19C connected to the stationary control contact 13c of the single pole switch 13. As previously indicated, as the pole 13a of the single pole switch 13 is moved from contact with the control contact 13c to contact with contact 13b, the voltage condition at the control contact 13c will shift between a condition where it receives a 60 cycle voltage to a condition where it receives no voltage. As the pole 13a is moved from contact with contact 13b to contact with control contact 13c, the condition of the control contact changes from a no signal condition to a 60 cycle voltage condition. The voltage change pulser circuit 26 is one wherein, upon each change of condition of the input voltage, it will generate a signal like a positive pulse at its output terminal 26b fed to "OR" gate 30, thereby duplicating the signal conditions produced by the successive depression of the time dial knob 21. Accordingly, as the time dial knob 21 is depressed or pole 13a of the switch 13 is moved from one contact position to another, a positive pulse will appear at the output terminal 30c of the "OR" gate 30, which is connected to an "OR" gate 32 to be described to effect ON and OFF marker setting operation during programming, and a power triac turn-on or turn-off operation initiated by the operation of toggle bistable 34.

ON and OFF markers are stored in a memory unit which is most preferably a recirculating shift register 42, which is shown as a 48 stage shift register where the basic timing intervals are one-half hour timing intervals. The register has shift pulse, data input, and data output terminals 42a, 42b and 42c, respectively. The output terminal 42c is an output terminal of the last (48th) stage of the shift register. The output terminal 42c of the shift register 42 is connected by a conductor 43 to the input 60a of a control gate 60 having an output 60b coupled to the shift register data input terminal 42b so that the information ultimately stored in the shift register can be recirculated.

The signals for controlling the feeding of shift pulses to shift input terminal 42a of the shift register 42 may be pulses spaced by the duration of each basic time interval controlled by the controller-timer, namely, one-half hour time intervals in the example of the invention being described. These pulses may be fed to the shift pulse input terminal 42a on a conductor 50 extending from the output terminal 48b of a basic time interval counter 48. The basic time interval counter 48 receives pulses on an input terminal 48a from the output terminal 44b of a pulse shaping circuit 44 whose input terminal 44a extends to any suitable source of pulses, which may be 60 or 120 cycle pulses from the power system or power supply circuit 27. The basic time interval counter 48a will generate a pulse at its output terminal 48b for each one-half hour time interval starting from the resetting of the timer. Such a resetting operation can be accomplished in a well-known manner, which resetting operation resets all of the bistable circuits, the shift register and other devices which must operate from a reset condition. Such a resetting can, for example, be effected by the disconnection of power from the timer, which occurs when the control arm 22 is moved to an "OFF/CLEAR" position. Then, when power is initially applied, the various bistable circuits are designed to start from a given reset condition of operation. It is thus apparent that the shift register 42 will shift any ON or OFF markers through the stages of the shift register in synchronism with the start of each half-hour basic time interval. A gate circuit 60' gates marker setting signals to the data input terminal 42b of the register. The gate circuit 60 is opened when gate circuit 60' is closed and visa versa. The control terminals 60c and 60c' of the gate circuits 60 and 60' receive gate-opening pulses on respective control lines 58 and 58' respectively extending from the Q and Q' output terminals of a set-reset bistable 56 which receives set pulses on its input terminal 56a from the output terminal of the twenty-four hour counter 46. Thus, the bistable circuit 56 is set following twenty-four hours from the time power is initially applied to the timer. Before this time, the output terminals Q and Q', respectively, have "0" and "1" signal conditions which respectively open the gate 60' so that the gate 60' passes markersetting signals to the data input terminal 42b of the shift register 42 during programming of the timer. During this period, the gate 60 is closed. When this twenty-four hour period is over, the gate 60' is closed and the gate 60 is open to recirculate "0" and "1" markers appearing at the output terminal 42c of the shift register 42.

The output terminal 42c of the shift register 42 is shown coupled to the inputs 62a and 62a', respectively, of positive and negative edge, one shot multivibrators 62 and 62' which are circuits which respectively generate a "1" signal (like a positive pulse) output for voltage inputs changing in positive and negative directions, respectively. These multivibrator circuits have enabling inputs 62c and 62c', respectively, which must receive a "1" signal to enable the circuit to operate. Thus, whenever the output condition of the last stage of the shift register changes from an "0" to "1" signal state, the positive edge one-shot multivibrator will produce a positive pulse, if this circuit is enabled to operate, and whenever the output condition of the last stage of the shift register 42 changes from a "1" to a "0" state, the negative edge one-shot multivibrator 62' will produce a positive pulse when this circuit is enabled to operate. The outputs of the one-shot multivibrators 62 and 62' are fed to inputs 32c and 32b of an "OR" gate 32 whose output is fed to input 34a of a toggle bistable 34.

The one-shot multivibrator enable input terminals 62c and 62c' respectively extend to the outputs of "AND" gates 63 and 63' having inputs 63a and 63a' connected by a common conductor 65 to contacts 67a and 67a' of contact pairs 67a–67b and 67a'–67b' bridged respectively by wiper 67 when the control arm 22 is respectively in "MAN" and "ON" positions. The terminals 67b' and 67b are respectively grounded and connected to V+ so that the multivibrators 62 and 62' are enabled only during timer-on operation. The other input 63b of "AND" gate 63 is connected to the Q' output of the toggle bistable 34 and the other input 63b' of the "AND" gate 63' is connected to the Q output of the toggle bistable 34. It is thus apparent that the positive edge one-shot multivibrator 62 will be enabled to operate when the Q' output of the toggle bistable 34 is in a "1" state, which occurs when the power triac is non-conductive. Similarly, the negative edge one-shot multivibrator 62' is enabled for operation when the power triac is conductive. With this circuit logic, each transition in the output of the shift register 42 will result in a reversal of the state of operation of the power triac 24, except when the circuit had been previously overridden by the depression of the control knob 21 or operation of switch 13 which independently toggles the bistable 34 as previously explained. The operation of the toggle bistable 34 can be overridden by the depression of the control knob 21 or operation of switch 13 and timer controlled operation is re-established in the subsequent transition of the output of the shift register 42 which can be effective to change the operative stage of the power triac 24.

The Q' output of the toggle bistable 34 is coupled by conductor 70 to the reset input 72a of a set-reset bistable 72. Since the output Q' of the toggle bistable 34 is in a "1" state continuously when the triac 24 is in a non-conductive state, bistable 72 will be continuously in a reset state under these conditions. When the triac 24 is to be operated to a conductive state, the toggle bistable output Q' will be in a "0" state which then enables the set-reset bistable 72 to be set by a "1" signal fed to its set input line 72b on what is referred to as the zero cross signal line 74 which is shown extending from the juncture of power supply rectifier 27b and resistor 27c. In the description of the power supply circuit to be later made in connection with the most preferred form of the invention shown in FIG. 6, it will be shown that when the triac 24 is initially triggered into a conductive condition (which then becomes a more or less continuous state, except for a few degrees at the beginning of each half cycle of the AC voltage before the triac 24 is re-fired), a pulse waveform appears at the rectifier 27b just as the applied AC voltage goes through zero in a positive direction, (see waveforms (a) in FIGS. 7A and 7B) to set the set-reset bistable 72, until a signal is received by the toggle bistable 34 calling for a return of the triac 24 to a non-conductive state. The purpose of the zero crossing signal is to initiate the energization of the lighting device 11 when the applied AC voltage is going through zero, since to initiate energization of the lighting device 11 when the applied voltage is of a substantial value would limit the life of the lighting device 11. When the toggle bistable 34 is operated into a condition to return the triac to a non-conductive state, a steady "1" signal which then appears on the toggle bistable output Q' will then continuously reset the set-reset bistable 72. The output of the set-reset bistable 72 will have a "1" signal state when it is set and a "0" state when it is reset. The power supply control circuit 27d will, in a manner to be explained, operate the triac 24, respectively, in conductive and non-conductive states respectively, when the output of the set-reset bistable 72 is respectively in "1" and "0" states.

The circuit of FIG. 3 will operate reliably provided no appreciable stray power line voltage is coupled as by an inter-conductor capacitance to the input line 20 of the voltage change pulser circuit 26 connected to the control contact 13c of the single pulse switch 13. It is to be noted that when the lines 15 and 17 which extend from the screw terminals 14c and 14b of the switch 13 extend over long distances, which is sometimes the case, the amount of inter-conductor capacitance can be sufficiently great that stray power line voltages can be capacitively coupled to the control conductor 15, which would feed the 60 cycle signal to the input 26a of the voltage change pulser circuit 26 during the time when no such signal should appear thereat, namely when the movable pole 13a of switch 13 is out of contact with the control contact 13c. This stray 60 cycle voltage can trigger the voltage change pulser circuit 26 and generate a pulse in the output 26b thereof which can operate the toggle bistable 34 and change the triac state when no such operation is desired. The circuit of FIG. 6, to be described, overcomes this problem. However, to best understand this problem, it is desirable now to describe a preferred circuit for the voltage change pulser circuit 26. For this purpose, reference to FIG. 4 should now be made.

Figure 4:
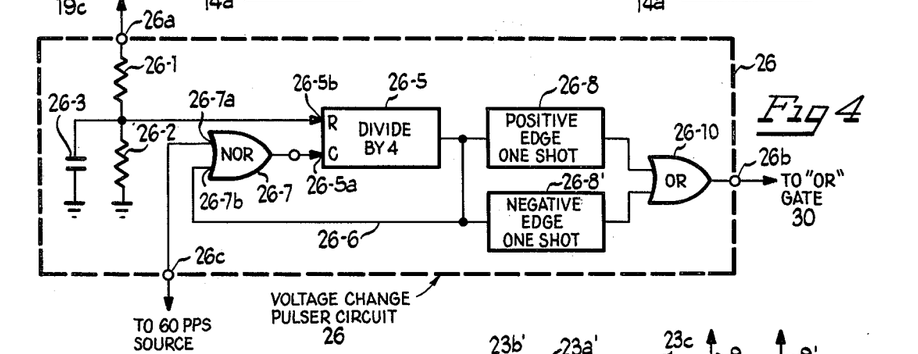
FIG. 4 shows a detailed block diagram of the preferred voltage change pulser circuit shown as a single block in FIG. 3.

The input 26a of the circuit 26 is connected to one end of a series circuit comprising resistors 26-1 and 26-2 whose other end is grounded. A capacitor 26-3 is shown connected across the resistor 26-2. A 60 Hz voltage applied to the input 26a of the circuit 26 will produce a similar waveform voltage across the resistor 26-2, which voltage is fed to the reset input of a divide by 4 circuit 26-5 to prevent the circuit from responding to any pulses fed thereto. The output of the divider circuit 26-5 then remains in a "0" state. The divider circuit 26-5 has a clock input where 60 pps pulses are fed, the input extending to the output of a "NOR" gate 26-7 having one of its inputs 26-7a connected to the line extending to the 60 pps pulse source (which may be a Schmidt trigger circuit connected to triac terminal 24b). If the divider circuit 26-5 is not reset because the switch pole 13a is moved from control contact 13c, the divider circuit will count the pulses fed to the clock input thereof, and when a count of 4 is reached the signal on the output 26-5 thereof will change from a "0" to a "1" signal condition. This "1" signal condition is fed back by a conductor 26-6 to a second input 26-7b of the "NOR" gate 26-7 which will then provide a steady "0" signal condition at the output thereof to prevent and further count pulses from entering the divider. This change in a positive direction from a "0" to "1" signal condition at the output of the divider circuit 26-5 is converted to a single positive pulse by a positive edge one-shot multivibrator 26-8 the input of which is connected to the divider circuit output. The output of this positive edge one-shot multivibrator 26-8 is connected to an "OR" gate 26-10, whose output is connected through the output 26b of the circuit 26 to the input 30a of the "OR" gate 30.

When the signal output condition of the divider circuit 26-5 is initially in a locked-in "1" state, it is switched to a "0" state by the re-appearance of a 60 Hz input from the switch 13 when the pole 13a is moved to the control contact 13c. This resets and changes the "1" input of the divider circuit back to an "0" state. This output change is converted to a positive pulse by a negative edge one-shot multivibrator 26-8', whose input is connected to the divider circuit output. This positive output pulse of the negative edge one-shot multivibrator 26-8' is connected to said "OR" gate 26-10 which feeds this positive pulse to the "OR" gate 30.

Figure 5A:
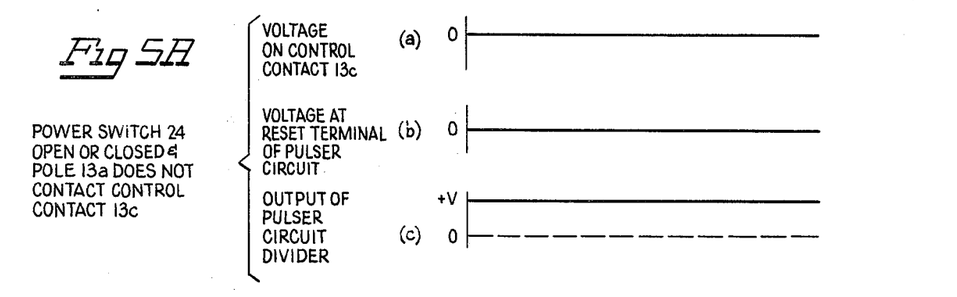
FIGS. 5A, 5A', 5B and 5C show on common time bases voltage waveforms occurring in various portions of the circuit of FIGS. 3 and 4 under the different circuit operating conditions identified thereon.
Figure 5B:
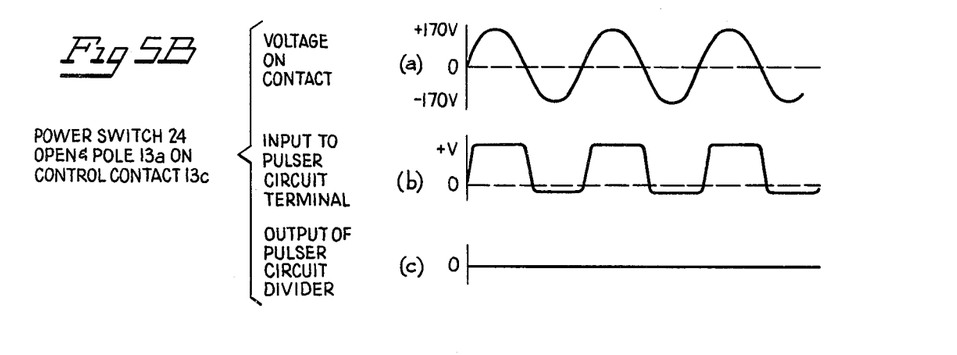
Figure 5C:
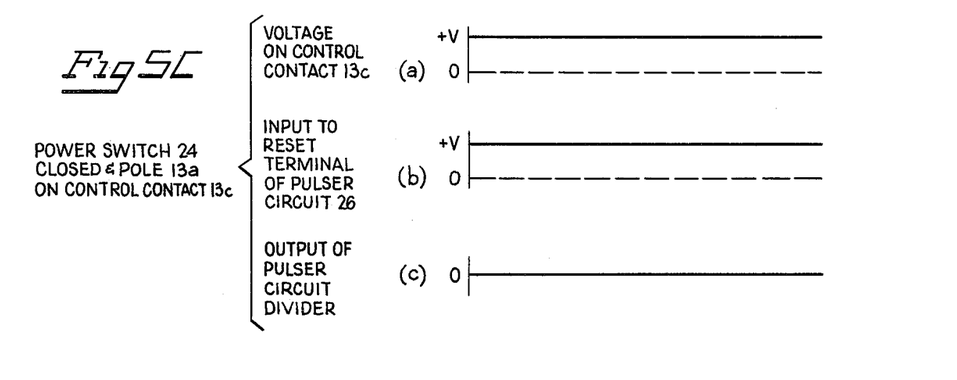

The operation of the voltage change pulser circuit 26 and the problem of a 60 cycle pick-up voltage which can adversely effect the operation of the timer can best be understood by reviewing the voltage waveforms shown in FIGS. 5A, 5A', 5B and 5C under the various operating conditions of the timer indicated thereon.

Referring to FIG. 5A, when the triac 24 is non-conductive or conductive, and the switch pole 13a is not contacting the control contact 13c, in the absence of any stray 60 cycle pick-up the voltage on this contact continuously is zero, the voltage on the reset terminal 26-5b of the divider 26-5 will be zero, permitting the divider to count to its full count, and the output of the divider will be a "1" signal, as shown by the steady V+ voltage on waveform (c). However, if a stray 60 cycle voltage pick-up occurs on the conductor 15 connected to the control contact 13c, the pulser circuit 26 will be reset and the divider 26-5 will not be able to count to its full count. In FIG. 5A', waveform (a) shows the 60 cycle pick-up voltage, and waveform (b) shows the voltage at the reset terminal 26-5b of the divider 26-5. (Note that the negative going portions of the waveform are clipped by rectifiers which are commonly to be found in such divider circuits). Since the divider 26-5 cannot count to its full count, the output of the divider is zero, as shown by waveform (c) of FIG. 5A'. It is thus apparent that the divider output would have shifted from the V+ condition shown in FIG. 5A to the zero voltage condition shown in 5A', to cause the negative-edge one shot multivibrator 26-8' to produce a positive pulse to change the condition of the triac 24 when no such change was desired. The most serious problem caused by the stray 60 cycle pick-up is that it effectively disables the operation of the timer because no change in state of the pulser divider circuit output is possible since the stray pick-up or the other signals present on the control line 19C will continuously reset the counter to prevent any change in the output state of the pulser divider circuit.

When the movable pole 13a of switch 13 is moved from the contact 13b to the control contact 13c, the voltage appearing on the control contact is the sinusoidal waveform (a) in FIG. 5B. Because of the clipping action afforded by the voltage change pulser circuit 26, the pulses appearing at the reset input 26-5b of the divider 26-5 will be limited to V+ volts, such as +5 volts, and the negative portions thereof will substantially be clipped, as shown, to provide the waveform (b), which obviously will prevent the divider 26-5 from acquiring a full count. The output of the divider 26-5, as shown by waveform (c), is thus a "0" or zero voltage signal desirably to produce a positive pulse output, to switch the condition of the triac 24 involved. When the triac 24 is switched to a conductive state, as shown in FIG. 5C, with the movable pole 13a on the control contact 13c, the voltage on the control contact 13c will be a continuous V+ voltage, which prevents the divider 26-5 from obtaining a full count, so that the output of the divider will remain at zero volts. The movement of the movable pole 13a back to the contact 13b will re-establish the voltage conditions shown in FIG. 5A, which will return the output of the divider 26-5 to the V+ signal condition which causes the positive-edge one shot multivibrator 26-8 to produce a positive pulse, which reverses the condition of the triac 24 once again.

Figure 6:
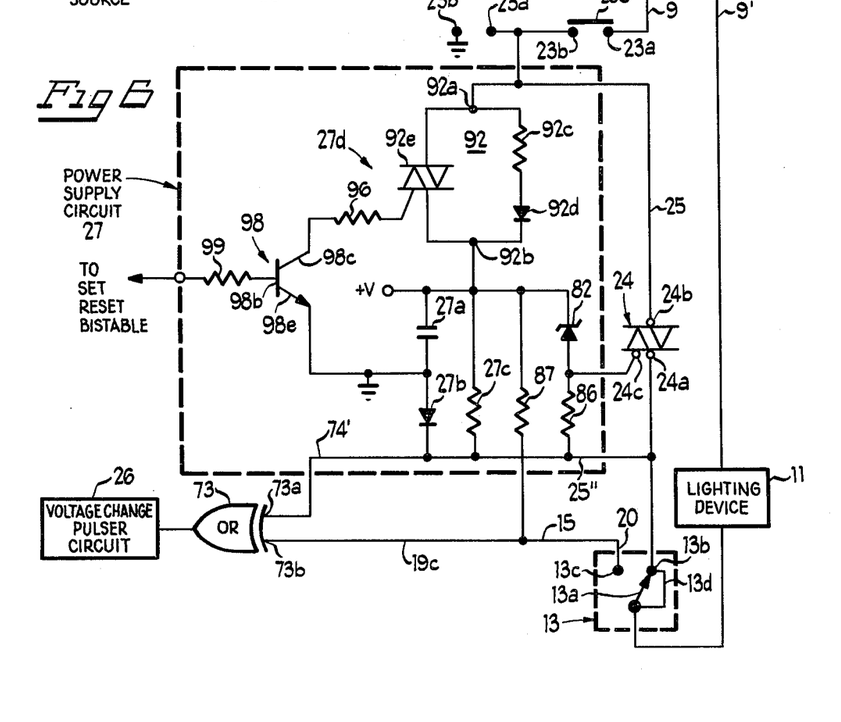
FIG. 6 illustrates a modification of the circuit shown in FIG. 3, where the connections of both the triac and power supply connected across the load terminals of the triac are reversed from that shown in FIG. 3, and an exclusive "OR" gate has been added in front of the voltage change pulser circuit to make the same operate more reliably, such as under the circumstances of a stray 60 cycle interference signal coupled to the input of the pulser circuit by inter-conductor capacitance when the control conductor extending between the single pole switch and the timer extend over substantial distances.

Reference should now be made to FIG. 6 which illustrates a modified timer circuit which avoids the false operation of the voltage change pulser circuit 26 by a stray 60 cycle pick-up voltage on the control conductor 15 extending from the control contact 13c of the switch 13. The main difference between the circuit of FIG. 3 and the circuit of FIG. 6 is that the connections of the triac 24 and the power supply circuit 27 connected across the load terminals of the triac are reversed, and an exclusive "OR" gate 73 is connected to the input of the voltage change pulser circuit 26, as previously described. The exclusive "OR" gate 73 has an input 73a connected to a zero crossing signal line 74' connected to the juncture of the aforementioned power supply circuit rectifier 27b and resistor 27c. The voltage appearing on the zero crossing signal line 74' is a distinct voltage, both under the conditions when the power triac 24 is conductive or non-conductive, so that under the conditions where the pole 13a of the switch 13 is not in contact with the control contact 13c, the conditions under which voltage pick-up is a problem, a zero crossing signal appearing on one of the inputs to the exclusive "OR" gate 73 can never be identical to the 60 cycle pick-up signal appearing at the other input of the exclusive "OR" gate 73, so that no false triggering of the voltage change pulser circuit 26 can take place. The other input 73b of the exclusive "OR" gate 73 is fed from the control conductor 19C of the controller-timer, which conductor is connected to the conductor 15 extending to the control contact 13c of the switch 13. An exclusive "OR" gate is a circuit which only produces a "1" signal (or a positive voltage in the present case) when the input signals are not both in "1" or "0" signal states. The exclusive "OR" gate 73 is a typical gate which will detect a "1" signal on an input thereof when this signal exceeds a given threshold level and will detect a "0" signal when the voltage on an input thereof is below this threshold. When the pole 13a of the switch 13 is connected to the control contact 13c, because of the inversion of the connections of the power supply and triac in FIG. 6 from that shown in FIG. 4, it can be seen that an identical voltage is coupled to both inputs of the exclusive "OR" gate 73 because the two inputs to this "OR" gate are shorted by the pole 13a. In case there is a lack of circuit symmetry between the inputs to the exclusive "OR" gate 73 which results in unequal voltages at the gate inputs detectable as different signals, suitable balancing circuits well-known in the art should be added to avoid any problems due to such lack of circuit symmetry. These well-known techniques have not been disclosed in FIG. 6 for purposes of simplifying the present disclosure.

Figure 7A:
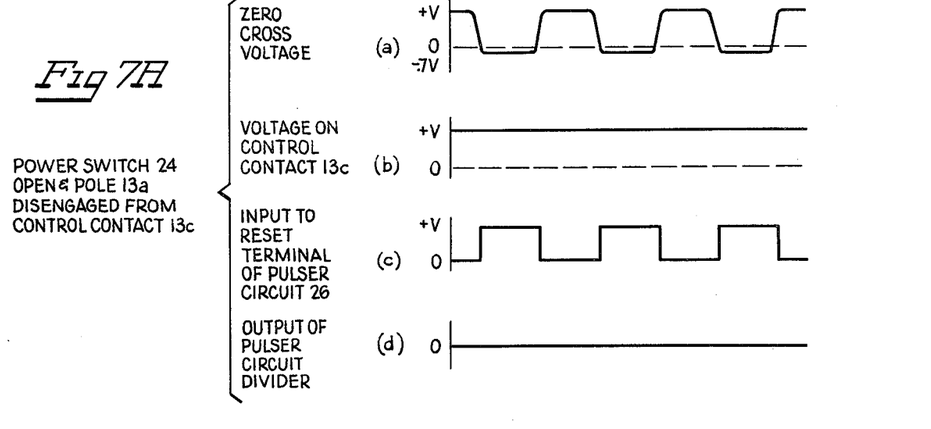
FIGS. 7A, 7B, 7A', 7B', 7C and 7D show on common time bases voltage waveforms occurring in various portions of the circuit of FIG. 6 under the different circuit operating conditions identified thereon.
Figure 7B:
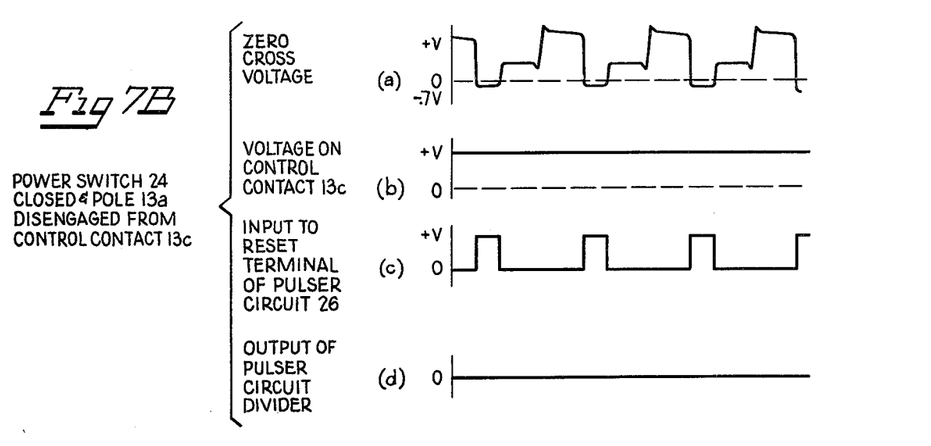
Figure 7C:
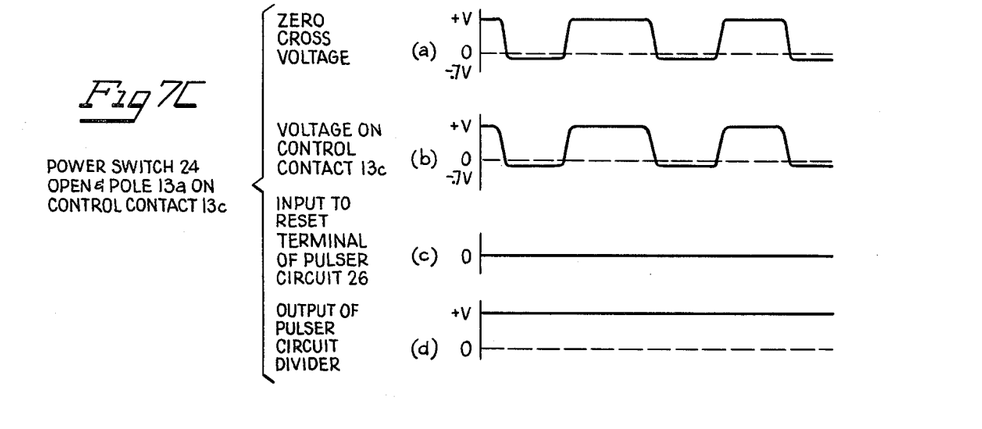
Figure 7D:
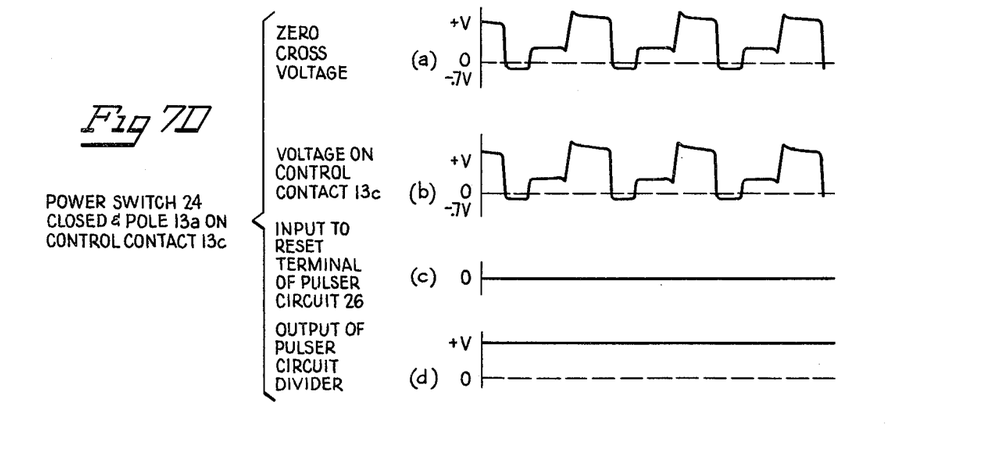

The various waveforms which are present in the circuit of FIG. 6 under the various operating circuit conditions described are shown in FIGS. 7A, 7B, 7A′, 7B′, 7C and 7D which are self explanatory. However, special reference should now be made to FIGS. 7A′ and 7B′ which illustrate by waveforms (a) the signal on the zero crossing signal line 74′ under the conditions where the triac 24 is respectively in a non-conductive and conductive condition. As shown in waveforms (a) therein, it can be noted that the stray 60 cycle pick-up voltage appearing on the control conductor 15 bears no relationship, except as to phasing, to the zero cross signal waveforms. Accordingly, the exclusive "OR" gate 73 will produce at the output thereof the "1" signal pulses shown in waveforms (c), which prevent the divider 26-5 from effecting a full count, which is the identical condition which is desired in the circuit now being described when no such pick-up voltage appears on the conductor 15. (For example, see FIGS. 7A and 7B showing the various signal conditions when no such voltage is picked up on the conductor 15.)

FIG. 6 illustrates the control circuit 27d of the power supply 27, which will now be described. Connected to the ungrounded plate of capacitor 27a is the cathode of a zener diode 82 which limits the DC voltage across the capacitor plates to a given desired value, for example, +4 volts.

The control terminal 24c of the triac 24 is connected to a trigger signal developing impedance shown in the form of a resistor 86, connected between conductor 25″ and the anode of the zener diode 82. When the triac 24 is to be operated in a conducting mode, short voltage pulses of alternating polarity appear across the resistor 86 shortly after the beginning of successive half cycles of the applied AC voltage, which pulses initiate conduction of the triac 24 a few degress after the applied AC voltage passes through zero. Once conduction is initiated each half cycle between the triac load terminals, conduction therebetween continues for the remainder of the half cycle involved, until the current flow drops below a given holding current level. The triac 24 then becomes non-conductive until triggered into a conductive state by another trigger signal fed to control terminal 24c once again during the next half cycle involved. The development or disappearance of triac triggering signals across resistor 86 is determined by the set-reset bistable 72.

Charging current to the capacitor 27a flows through a parallel branch impedance circuit 92 connected in series with the capacitor 27a. The terminal 92a of the parallel branch impedance circuit 92 remote from the energy storage capacitor 27a is connected to the AC conductor 9. The opposite terminal 92b of the parallel branch impedance circuit 92 is connected to the V+ terminal of the energy storage capacitor 27a. The rectifier 27b is connected between the grounded plate of capacitor 27a and conductor 25″ so that the capacitor 27a charges every other half cycle through the parallel branch impedance circuit 92. The voltage appearing across the rectifier 27b is the zero crossing signal previously described and shown by waveforms (a) under power triac conducting and non-conducting conditions in FIGS. 7A and 7B.

The parallel branch impedance circuit 92 comprises a continuously high impedance branch including a resistor 92c having a resistance many orders greater than the resistance of the lighting device 11. For example, resistor 92c may have a value many hundreds of times greater than that of the load device 4, so that the resistor 92c will absorb only a small fraction of the load rated power when power triac 24 is non-conductive. An energy-saving rectifier 92d is shown connected in series with the resistor 22c so that the resistor carries capacitor charging current only every other half cycle when the AC conductor 9 is positive, to eliminate energy dissipation in the resistor 92c during the intervening half cycles.

Connected in parallel with resistor 92c and rectifier 92d is a low power control triac 92e (which costs only a fraction of the power triac 24). When the power triac 24 is to be operated in the conductive mode, the control triac 92e is conductive every half cycle, so that current flows in alternating directions through trigger voltage developing resistor 86 during successive half cycles of the applied AC voltage. The gate or control terminal of the control triac 92e is preferably connected to ground through a resistor 96 and the collector-emitter terminals 98c–98e of a control transistor 98. When it is desired to operate the power triac 24 in a conductive mode, a positive voltage is fed to the base 98b of the transistor 98 beginning with the first passage through zero thereafter of the applied AC voltage. This base applied positive voltage remains applied to the base 98b until it is desired to operate the power triac 24 in a non-conductive mode in the particular circuit shown in FIG. 6 so as to render the control triac 92e continuously non-conductive.

At the beginning of each positive half cycle of the applied AC voltage the capacitor 27a is charged so that the voltage thereacross increases as it charges through the high impedance of resistor 92c under no load condition when power triac 24 is continuously non-conductive, or through control triac 92e when the power triac 24 is to be operated in its conductive mode. The capacitor 72a discharges during the intervening half cycles of the applied AC voltage.

When the control triac 92e is continuously non-conductive (i.e. when the power triac 24 is to be continuously non-conductive), the voltage on the ungrounded capacitor plate may never charge to a value which effects breakdown of the zener diode 82. (Even if the zener diode 82 should break down, the high resistance in the circuit limits the current flow through trigger voltage developing resistance 86 to a value where the power triac 24 is not triggered into conduction.) However, when the power triac 24 is to be operated in a conductive mode and the AC input conductor 9 is positive with respect to the conductor 25″ and the gate of control triac 92e is grounded through the transistor 98, the resulting triggering of the control triac 92e causes the capacitor 27a to charge to a voltage which, because of the low resistance charge circuit involved, rapidly rises to a voltage (e.g. +5 volts with respect to ground) where the zener diode 82 breaks down. The sudden large pulse of current then flowing through the resistor 86 develops a voltage which triggers the power triac 24 into conduction, causing the voltage across the power triac terminals suddenly then to decrease to a very low value, where the storage capacitor 27a will then discharge, since the voltage applied to the capacitor 27a is now the very low voltage across the power triac 24. At the beginning of each intervening negative half cycle of the applied AC voltage when the capacitor 27a is not charged because of rectifier 27b, when the control triac 92e is conductive, a relatively large negative current flows through resistor 86 and the zener diode 82 is then conducting in a forward direction. This current produces a triggering voltage for the power triac 24 (which had become non-conductive when the current through the same dropped below its holding current level near the end of the previous half cycle).

In one satisfactory power supply and control curcuit, some of the components shown in FIG. 6 were as follows:
resistor 92c—5.6K ohms
capacitor 27a—330 microfarads
resistor 86—18 ohms
triac 92e—0.8 amp RMS rating
triac 24—8 amp RMS rating
zener diode 82—4.3 volt breakdown device
resistor 27c—10,000 ohms The present invention has thus provided a unique combination of an unusually wired single-pole switch and a controller, especially a controller-timer, which has greatly facilitated the use of such a timer as a replacement for an existing toggle switch to manually or automatically control home lighting circuits previously wired for control by a 3-way switching system.

It should be understood that numerous modifications may be made in the exemplary controller systems just disclosed without deviating from the broader aspects of the invention.

I claim:

1. In an electrical power control system comprising a power circuit including a source of power, control apparatus having a pair of power circuit connecting terminals to be connected to said power circuit, where the power circuit or said apparatus may include or be connected to a load device to be selectively energized or de-energized by the control apparatus from signals manually or otherwise generated or received by the apparatus, or by operation of an external single-pole switch, a single-pole switch having a movable pole and at least one stationary contact, said pole being movable between a first position to a second position where it makes contact with a stationary contact which is to constitute a control contact, said single-pole switch being permanently connected to the power circuit and one of said power circuit connecting terminals so that the power circuit will continuously feed power to the power circuit connecting terminals of the control apparatus to which it is connected and said pole continuously has thereon the voltage of said source of voltage, said control apparatus further including power switch means coupled between said power circuit connecting terminals and operable to power circuit closing and opening conditions which respectively effect connection and disconnection of said power circuit connecting terminals, and control means for operating said power switch means between said power circuit closing and opening conditions in response to said signals manually or otherwise generated or received by said control apparatus, the improvement wherein said control apparatus includes a control input terminal to receive signals from said control contact of said single-pole switch, said control means including signal change detecting means for generating a control signal whenever the signal fed to said control terminal of said apparatus changes from a signal to a no-signal or from a no-signal to a signal condition, and said control means includes means responsive to the successive generation of said control signals for successively operating said power switch means between said power circuit closing and power circuit opening conditions.

2. The control apparatus of claim 1, wherein said signal change detecting means generates an identical control signal each time the signal condition on said control input terminal changes between a no-signal to a signal or from a signal to a no-signal condition, and toggle switch means responsive to said identical control signals for operating said power switch means in said different conditions.

3. The control apparatus of claim 2, wherein said control apparatus includes manually operable switch means operable successively by the user to generate identical control signals as generated by said signal change detecting means and which perform the same functions in the apparatus.

4. The control apparatus of claim 1, wherein said control apparatus is a timer wherein said control means includes user programmable means for automatically controlling the feeding of signals to said power switch means to operate the same between said power circuit closing and opening conditions, said programmable means comprising storage means having respective storage locations in which are stored power turn-on or turn-off markers assigned to various time intervals over a twenty-four hour period during which intervals the user may desire said power switch means to be operated to either one of said conditions, manually operable marker setting and storage location accessing means operable to turn-on marker and turn-off marker setting conditions for generating marker setting or retaining signals and effecting the placement or retention in a selected storage location in said storage means of a turn-on or turn-off marker, said marker setting and locating accessing means including a manually operable switch on said apparatus operable successively to generate power turn-on and power turn-off markers respectively which are then stored in different storage locations of said storage means, marker responsive control means for operating said power switch means in accordance with the markers stored in said storage means, and manually operable timer condition setting means for selectively rendering said marker responsive means operable or inoperable.

5. The control apparatus of claim 4, wherein said control means includes means responsive to the successive operation of said manually operable switch forming part of said marker setting and location accessing means for successively operating said power switch means between said power circuit closing and opening conditions.

6. The control apparatus of claim 5, wherein said control means includes means responsive to a change in signal condition on said control terminal of said apparatus from a no-signal to a signal condition or from a signal to a no-signal condition for carrying out the identical operations as would be carried out by the successive operation of said manually operable switch.

7. The control apparatus as claimed in any of claims 1, 2, 3, 4, 5 or 6, combined with said external power circuit and said single-pole switch wherein said power circuit includes a pair of power conductors across which energizing voltage is applied, and means for connecting said power conductors, said single-pole switch, and power switch means in mutual series circuit relation.

8. The control apparatus as claimed in any of claims 1, 2, 3, 4, 5 or 6, combined with said external power circuit, said single-pole switch and load device, and wherein said power circuit includes a pair of power conductors across which energizing voltage is applied, and means for connecting said power conductors, said single-pole and first stationary contact of said single-pole switch, load device and power switch means in mutual series circuit relation.

9. In a power control system including a pair of power conductors across which energizing voltage is to be applied, a load device, and power switch means operable between power circuit closing and opening conditions, said power conductors, load device and power switch means being in mutual series circuit relation, the improvement comprising: a single-pole switch interposed in series circuit relation with said load device and power switch means, said single-pole switch having a movable single-pole, at least one stationary contact to which said movable pole can be moved from a first position disconnected from said one stationary contact to a second position where it engages said stationary contact, said single pole being continuously connected in series with said lighting device and power switch means independently of the position of the movable pole; and control means for controlling said power switch means including signal change detecting means, and signal responsive means connected to said one stationary contact of said single-pole switch and responsive to the change of the signal condition on said stationary contact from either a no-signal to a signal condition or from a signal to a no-signal condition occurring as said single-pole is moved from said first to said second position or from said second position to said first position for successively operating said power switch means between said power circuit closing and opening conditions.

10. The power control system of claim 9, wherein said signal change detecting means generates an identical control signal each time the signal condition on said control input terminal changes between a no-signal to a signal or from a signal to a no-signal condition, and toggle switch means responsive to said identical control signals for operating said power switch means in said different conditions.

11. The power control system of claim 10, wherein there is provided in addition to said single-pole switch manually operable switch means operable successively by the user to generate identical control signals as generated by said signal change detecting means and which perform the same functions in the apparatus.

12. The power control system of claim 1, wherein said control means forms a timer and includes user programmable means for automatically controlling the feeding of signals to said power switch means to operate the same between said power circuit closing and opening conditions, said programmable means comprising storage means having respective storage locations in which are stored power turn-on or turn-off markers assigned to various time intervals over a twenty-four hour period during which intervals the user may desire said power switch means to be operated to either one of said conditions, manually operable marker setting and storage location accessing means operable to turn-on marker and turn-off marker setting conditions for generating marker setting or retaining signals and effecting the placement or retention in a selected storage location in said storage means of a turn-on or turn-off marker, said marker setting and locating accessing means including a manually operable switch on said apparatus operable successively to generate power turn-on and power turn-off markers respectively which are then stored in different storage locations of said storage means, marker responsive control means for operating said power switch means in accordance with the markers stored in said storage means, and manually operable timer condition setting means for selectively rendering said marker responsive means operable or inoperable.

13. The power control system of claim 9, wherein said control means forms a timer and includes user programmable means for automatically controlling the feeding of signals to said power switch means to operate the same between said power circuit closing and opening conditions, said programmable means comprising storage means having respective storage locations in which are stored power turn-on or turn-off markers assigned to various time intervals over a twenty-four hour period during which intervals the user may desire said power switch means to be operated to either one of said conditions, manually operable marker setting and storage location accessing means operable to turn-on marker and turn-off marker setting conditions for generating marker setting or retaining signals and effecting the placement or retention in a selected storage location in said storage means of a turn-on or turn-off marker, said marker setting and location assessing means including a manually operable switch on said apparatus operable successively to generate power turn-on and power turn-off markers respectively which are then stored in different storage locations and said storage means, marker responsive control means for operating said power switch means in accordance with the markers stored in said storage means, and manually operable timer condition setting means for selectively rendering said marker responsive means operable or inoperable.

14. The power control system of claim 13, wherein said control means includes means responsive to the successive operation of said manually operable switch forming part of said marker setting and location accessing means for successively operating said power switch means between said power circuit closing and opening conditions at least when said condition setting means has rendered said marker responsive means inoperable.

15. The control apparatus or power control system of claim 1 or 9 wherein said power circuit is an AC power circuit, said signal change detecting means includes a pulse counter which has an initial DC output signal condition and counts to a given full count to produce a second locked-in DC signal output condition until the counter is reset, means for producing the same given control signal for positive or negative going signals so that said control signal is produced whenever the pulse counter output changes between said initial and second locked-in condition, means for feeding to said counter pulses produced at a given rate to be counted by said pulse counter, and reset means for feeding pulses to said pulse counter to reset the same at a rate preventing said counter from reaching its full count, said reset means including means responsive to the power line frequency signals present on said control input terminal of the control apparatus when the movable pole of said external single-pole switch is in contact with said second stationary contact thereof for resetting said counter.

16. The control apparatus or power control system of claim 1 or 9 wherein said power circuit is an AC power circuit, said signal change detecting means includes a logic circuit which has a first signal output when a pair of inputs thereto have the same signal condition and a second signal output when a pair of inputs have different signal conditions, means connecting said control terminal of said control apparatus to one of the inputs of said logic circuit, means for generating and feeding to only the other of said inputs of the logic circuit when said movable pole of the external switch does not contact said second stationary contact a first signal which is always different from the stray AC signal which may undesirably appear on the conductor interconnecting said second stationary contact of the external switch and said control input terminal of the control apparatus, and circuit connections which interconnect said pair of input terminals of the logic circuit through the movable pole of said external switch when connected to said second stationary contact so that identical signals are fed to said pair of input terminals under such conditions, and control signal generating means responsive to the output of said logic circuit each time the signal output condition of the logic circuit changes.

17. The control apparatus or power control system of claim 1 or 9 wherein said power circuit is an AC power circuit, said signal change detecting means includes a pulse counter which has an initial DC output signal condition and counts to a given full count to produce a second locked-in DC signal output condition until the counter is reset, means for producing the same given control signal for positive or negative going signals so that said control signal is produced whenever the pulse counter output changes between said initial and second locked-in condition, and means for feeding to said counter pulses produced at a given rate to be counted by said pulse counter, and reset means for feeding reset pulses to said pulse counter to reset the same at a rate preventing said counter from reaching its full count, said reset means being a logic circuit which has a reset signal output terminal which has a first signal output condition when a pair of inputs thereto have the same signal condition and a second signal output condition when the pair of inputs have different signal conditions, means connecting said control terminal of said control apparatus to one of the inputs of said logic circuit, means for generating and feeding to only the other of said inputs of the logic circuit when said movable pole of the external switch does not contact said second stationary contact a first signal which is always different from the stray AC signal which may undesirably appear on the conductor interconnecting said second stationary contact of the external switch and said control input terminal of the control apparatus, and circuit connections which interconnect said pair of input terminals of the logic circuit through the movable pole of said external switch when connected to said second stationary contact so that the identical signals are fed to said pair of input terminals under such conditions.

18. The control apparatus or power control system of claim 1 or 9 wherein said power circuit is an AC power circuit, said signal change detecting means includes a logic circuit which has a first signal output when a pair of inputs thereto have the same signal condition and a second signal output when a pair of inputs have different signal conditions, means connecting said control terminal of said control apparatus to one of the inputs of said logic circuit, means for generating and feeding to only the other of said inputs of the logic circuit when said movable pole of the external switch does not contact said second stationary contact a first signal which is always different from the stray AC signal which may undesirably appear on the conductor interconnecting said second stationary contact of the external switch and said control input terminal of the control apparatus, and circuit connections which interconnect said pair of input terminals of the logic circuit through the movable pole of said external switch when connected to said second stationary contact so that identical signals are fed to said pair of input terminals under such conditions, and control signal generating means responsive to the output of said logic circuit each time to signal output condition of the logic circuit changes, said first signal being a signal generated as the applied AC signal passes through zero.

19. The power control system of claim 9 wherein said single-pole switch is a conventional 3-way switch normally having a pair of stationary contacts between which said single-pole is selectively movable and normally wired so that continuity between said pole and each of said contacts is alternately interrupted as the pole is moved between said contacts in the absence of an external jumper applied thereto, said continuous connection of said single pole in series with said lighting device and power switch means being obtained by a jumper wired between said pole and one of said stationary contacts, said other stationary contact being said one stationary contact connected to said signal responsive means.

* * * * *